(12) United States Patent
Jiang

(10) Patent No.: US 12,370,844 B2
(45) Date of Patent: Jul. 29, 2025

(54) COMBINED TIRE-DISASSEMBLING DEVICE AND HORIZONTAL CHANGER

(71) Applicant: Yingkou Liaonan Devi Machinery Equipment Co., Ltd., Liaoning (CN)

(72) Inventor: Guilin Jiang, Liaoning (CN)

(73) Assignee: YINGKOU LIAONAN DEVI MACHINERY EQUIPMENT CO., LTD., Liaoning (CN)

( * ) Notice: Subject to any disclaimer, the term of this patent is extended or adjusted under 35 U.S.C. 154(b) by 452 days.

(21) Appl. No.: 17/912,683

(22) PCT Filed: Jun. 28, 2021

(86) PCT No.: PCT/CN2021/102753
§ 371 (c)(1),
(2) Date: Sep. 19, 2022

(87) PCT Pub. No.: WO2022/033203
PCT Pub. Date: Feb. 17, 2022

(65) Prior Publication Data
US 2023/0211636 A1 Jul. 6, 2023

(30) Foreign Application Priority Data
Aug. 14, 2020 (CN) .......................... 202021689581.1

(51) Int. Cl.
*B60C 25/05* (2006.01)
(52) U.S. Cl.
CPC ................ *B60C 25/0593* (2013.01)
(58) Field of Classification Search
CPC .............. B60C 25/0518; B60C 25/138; B60C 25/0593

(Continued)

(56) References Cited

U.S. PATENT DOCUMENTS 6,823,922 B2 * 11/2004 Gonzaga ................. B60C 25/13
157/1.17
7,798,196 B2 * 9/2010 Gonzaga ................. B60C 25/13
157/1.22

(Continued)

FOREIGN PATENT DOCUMENTS

CN 101492001 A 7/2009
CN 101754876 A 6/2010

(Continued)

OTHER PUBLICATIONS

International Search Report mailed Sep. 15, 2021 in corresponding PCT application No. PCT/CN2021/102753.

*Primary Examiner* — Hadi Shakeri
(74) *Attorney, Agent, or Firm* — Nields, Lemack & Frame, LLC

(57) ABSTRACT

A combined tire-disassembling device is provided, and includes a first shaft with a pressing wheel at an end of the first shaft, and a second shaft with a disassembling and assembling hook at a first end of the second shaft, where a combined frame is provided on the first shaft, a shaft hole matched with the second shaft is provided in the combined frame, one end of a driving oil cylinder of second shaft is connected with the second end of the second shaft, and the other end of the driving oil cylinder of second shaft is connected with the combined frame. A large horizontal tire changer is further provided, which includes a base platform, a sliding platform provided at one end of the base platform, a chuck assembly and a tire disassembling mechanism a hydraulic driving device and an operating console.

8 Claims, 2 Drawing Sheets

(58) Field of Classification Search
USPC .......................................................... 157/1.22
See application file for complete search history.

(56) References Cited

U.S. PATENT DOCUMENTS

| | | | |
|---|---|---|---|
| 8,684,060 B2 * | 4/2014 | Corghi | .................... B60C 25/13 157/1.22 |
| 8,973,640 B1 * | 3/2015 | Hanneken | ........... B60C 25/0578 157/1.22 |
| 2010/0269982 A1 | 10/2010 | Corghi | |

FOREIGN PATENT DOCUMENTS

| | | |
|---|---|---|
| CN | 204055185 U | 12/2014 |
| CN | 206606015 U | 11/2017 |
| CN | 212685130 U | 3/2021 |
| JP | 2012-192866 A | 10/2012 |

* cited by examiner

COMBINED TIRE-DISASSEMBLING DEVICE AND HORIZONTAL CHANGER

This patent application is a national stage application of International Patent Application No. PCT/CN2021/102753 filed on 28 Jun. 2021, which claims the benefit and priority of Chinese Patent Application No. 202021689581.1 filed on 14 Aug. 2020, the disclosure of which is incorporated by reference herein in its entirety as part of the present application.

TECHNICAL FIELD

The present disclosure relates to the technical field of vehicle service equipment, in particular to a combined tire-disassembling device and a large horizontal tire changer which are used to disassembling and assembling a large tubed tire and a large tubeless tire.

BACKGROUND ART

In the related art, during a tire disassembling machine disassembles a large tubed tire, when the tire rotates in the tire disassembling process, the tire disassembling hook causes the inner tube to have varying degrees of damage or even the inner tube cannot be used anymore. The disassembling head of the traditional tire disassembling machine is an integral structure, and the positions of both the hook for disassembling a tire and the pressing wheel on the disassembling head are fixed, so that the relative position therebetween cannot be adjusted to use the tire disassembling hook and the pressing wheel separately. In the process of using the tire disassembling machine, it is necessary to rotate the disassembling head to change the positions of the hook for disassembling the tire and the pressing wheel, so as to hook tires and press tires, which is both time-consuming and labor-intensive.

The adjustable distance of the relative position between the tire disassembling mechanism and the chuck assembly is also relatively small, which cannot meet the needs of the disassembly and assembly of large tires, especially tires of a large tractor containing inner tubes.

SUMMARY

One of the technical problems to be solved by some embodiments is to provide a combined tire-disassembling device which can prevent the inner tube from being damaged and is convenient to be operated. Another technical problem to be solved by some embodiments is to provide a horizontal tire changer which can disassemble large tires by using the combined tire-disassembling device.

The present disclosure discloses a combined tire-disassembling device, which uses the technical scheme that the combined tire-disassembling device includes a combined frame, a first shaft with a pressing wheel at a first end of the first shaft, and a second shaft with a disassembling and assembling hook at a first end of the second shaft, where the combined frame is provided on the first shaft, a shaft hole matched with the second shaft is provided in the combined frame, and the second shaft is mounted in the shaft hole; and the combined tire-disassembling device further including an oil cylinder for driving the second shaft, one end of the oil cylinder for driving the second shaft is connected with a second end of the second shaft, and another one end of the oil cylinder for driving the second shaft is connected with the combined frame.

A preferred embodiment of the combined tire-disassembling device according to the present disclosure further includes an oil cylinder fixing lug provided at the second end of the second shaft, and the second end of the second shaft is connected with the oil cylinder for driving the second shaft through the oil cylinder fixing lug.

A preferred embodiment of the combined tire-disassembling device according to the present disclosure further includes a wheel-carrier seat with a hollow part in a middle thereof, a mounting seat and a wheel-carrier shaft which are provided at a second end of the first shaft, where the mounting seat is embedded in the hollow part of the wheel-carrier seat, and the wheel-carrier shaft extends through a front part of the wheel-carrier seat and the mounting seat, and is fixed with a tail part of the wheel-carrier seat.

A preferred embodiment of the combined tire-disassembling device according to the present disclosure further includes a first sliding trolley which is fixed with the wheel-carrier seat.

According to a preferred embodiment of the combined tire-disassembling device according to the present disclosure, a cross section of the first shaft is square.

According to a preferred embodiment of the combined tire-disassembling device according to the present disclosure, cross sections of both the second shaft and the shaft hole of the combined frame which is matched with the second shaft are hexagonal.

The present disclosure discloses a large tire changer, which uses the technical scheme that the large tire changer includes a base platform, a sliding platform provided at one end of the base platform, a chuck assembly and a tire disassembling mechanism which are movable along the sliding platform, a hydraulic driving device and an operating console, where the tire disassembling mechanism is the combined tire-disassembling device described above.

According to a preferred embodiment of the large tire changer according to the present disclosure, each of platform oil cylinders is provided between a bottom of a corresponding one of both ends of the sliding platform and the base platform, and the sliding platform is configured to be rotated by the platform oil cylinders when the platform oil cylinders are actuated.

According to a preferred embodiment of the large tire changer according to the present disclosure, a second sliding trolley matched with the sliding platform, a supporting and movable arm of which one end is vertically and fixedly connected with the second sliding trolley, a third sliding trolley provided at a front end of the supporting and movable arm, and a chuck and a driving unit for the chuck that are fixed on the third sliding trolley, where the supporting and movable arm is configured to rotate up and down when the sliding platform rotates.

According to a preferred embodiment of the large tire changer according to the present disclosure, the driving unit for the chuck includes a driving motor and a gear transmission mechanism, and the first sliding trolley, the second sliding trolley and the third sliding trolley are each driven by an oil cylinder.

Some embodiments have the following beneficial effects. According to the combined tire-disassembling device, the second shaft of the disassembling and assembling hook and a limiting sleeve of the disassembling hook form a kinematic pair, and the first shaft and the second shaft form a combined structure through the combined frame. In this way, the second shaft is able to independently expand and retract, or to expand and retract synchronously with the first shaft, so the combined device is convenient to be operated without damaging the inner tube when a tire is disassembled.

The horizontal tire changer for a large tire uses the combined tire-disassembling device, so that both the first shaft and the second shaft are able to be displaced by a larger distance, and the combined tire-disassembling device and the chuck assembly are be able to be displaced by a larger distance. When the sliding platform rotates along the horizontal axis, the supporting and movable arm can rotate up and down accordingly; and the chuck is able to move up and down through the sliding trolley. Therefore, in the technical solution, the tire-disassembling device can disassemble the tire with a diameter range up to 2500 mm, which can meet the disassembling and assembling requirements of oversized tires. In this way, the tire-disassembling device can be used for disassembling and assembling large-sized tires as well as tubed tires and tubeless tires.

The reference numbers in the figures indicate: 1 tire disassembling mechanism; 2 chuck assembly; 3 base platform; 4 operating console; 5 sliding platform; 6 hydraulic driving device; 9 third sliding trolley; 91 oil cylinder for driving the third sliding trolley; 11 first shaft; 12 second shaft; 13 combined frame; 14 wheel-carrier seat; 15 first sliding trolley; 151 oil cylinder for driving the first sliding trolley; 16 oil cylinder for driving the second shaft; 17 wheel-carrier shaft; 20 second sliding trolley; 21 supporting and movable arm; 22 chuck; 221 driving motor; 222 gear transmission mechanism; 31 platform oil cylinder; 32 connecting piece; 111 pressing wheel; 121 disassembling and assembling hook; and 122 cylinder fixing lug.

DETAILED DESCRIPTION OF THE EMBODIMENTS

In order to make the technical solutions of the present disclosure more distinct and clearer to those skilled in the art, the present disclosure will be described hereinafter in further detail with embodiments and drawings, but the embodiments of the present disclosure are not limited thereto.

Figure 1:
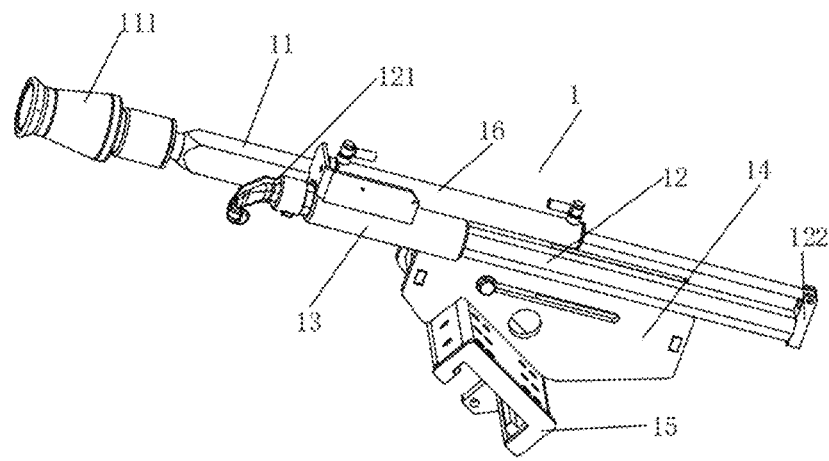
FIG. 1 is a schematic diagram of a tire disassembling mechanism according to an embodiment of the present disclosure.
Figure 2:
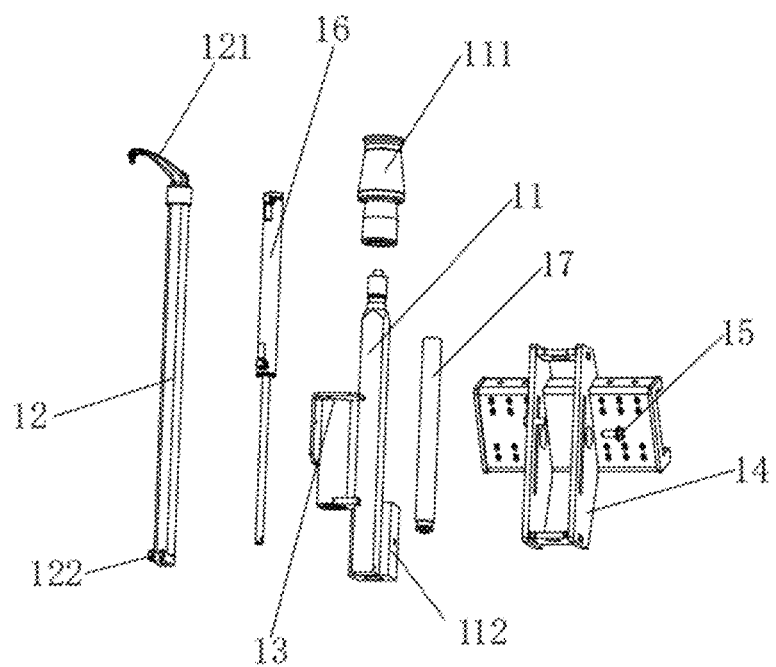
FIG. 2 is an explosion schematic diagram of a tire disassembling mechanism of FIG. 1.
Figure 3:
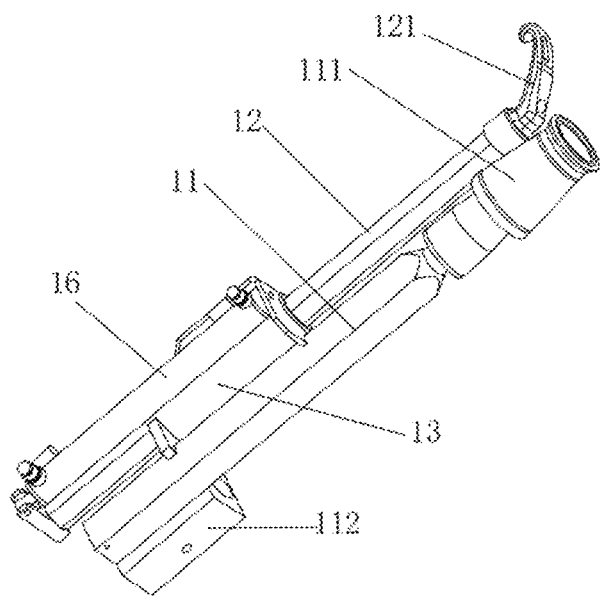
FIG. 3 is a schematic diagram of a disassembling and assembling hook at a position in an operating state.

Referring to FIG. 1 to FIG. 3, the combined tire-disassembling device according to an implementation of the embodiment includes a first shaft (i.e., a shaft of a pressing wheel) 11 and a second shaft (i.e., a shaft of a disassembling and assembling hook) 12. The first end of the first shaft 11 is provided with a pressing wheel 111, and the first end of the second shaft 12 is provided with a disassembling and assembling hook 121. The cross section of the first shaft 11 is generally square, and the cross section of the second shaft 12 and the cross section of the shaft hole of the combined frame matched with the second shaft are all generally hexagonal. The combined frame 13 is provided on the first shaft 11. The shaft hole matched with the second shaft 12 is provided in the combined frame 13, and the second shaft is mounted in the shaft hole and is able to slide backwards and forwards (i.e., to expand and retract) in the shaft hole. The combined tire-disassembling device further includes an oil cylinder 16 (i.e., an oil cylinder for driving the shaft of a disassembling and assembling hook). One end of the oil cylinder 16 is connected with the second end of the second shaft, and the other end of the oil cylinder is connected with the combined frame. When the driving oil cylinder 16 expands and retracts, the second shaft is driven to move backwards and forwards along the central axis of the shaft hole. Of course, an oil cylinder fixing lug 122 can also be provided at the second end (i.e., a tail end) of the second shaft, and the second end of the second shaft can be connected with the oil cylinder 16 for driving the second shaft through the oil cylinder fixing lug.

In the embodiment, the combined tire-disassembling device can further include a wheel-carrier seat 14 with a hollow part in the middle thereof, a mounting seat 112 which is provided at the second end of the first shaft 11 and a wheel-carrier shaft 17. The mounting seat is embedded in the hollow part of the wheel-carrier seat, and the wheel-carrier shaft 17 extends through the hole in the front part of the wheel-carrier seat and the mounting seat embedded into the hollow part of the wheel-carrier seat, and is fixed with the tail part of the wheel-carrier seat. The combined tire-disassembling device further includes a first sliding trolley 15 fixed with the wheel-carrier seat.

Figure 4:
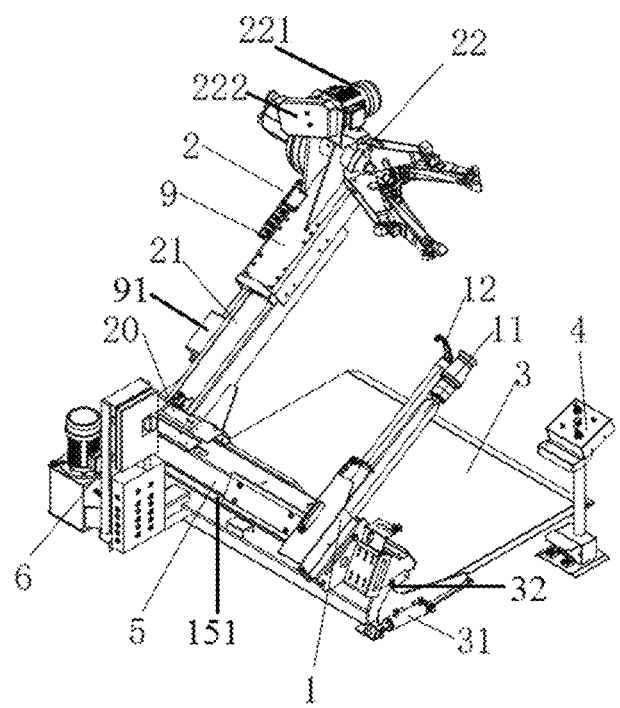
FIG. 4 is a perspective schematic diagram of a horizontal tire changer according to an embodiment of the present disclosure.

Referring to FIG. 4, a large horizontal tire changer according to an implementation of the embodiment includes a base platform 3, a sliding platform 5 provided at one end of the base platform, a chuck assembly 2 and a tire disassembling mechanism 1 which are movable along the sliding platform, a hydraulic driving device 6 and an operating console 4. The tire disassembling mechanism 1 is the combined tire-disassembling device described above. Each of platform oil cylinders 31 is provided between the bottom at a corresponding one of both ends of the sliding platform 5 and the base platform 3, the sliding platform 5 is rotatably connected to the base platform 3 through a connecting piece 32 above the platform oil cylinder 31, and the sliding platform is capable of being rotated by the platform oil cylinders, when the platform oil cylinders are actuated.

In the embodiment, the chuck assembly 2 includes a second sliding trolley 20 cooperated with the sliding platform, a supporting and movable arm 21 of which one end is vertically and fixedly connected with the second sliding trolley, a third sliding trolley 9 provided at the front end of the supporting and movable arm, and a chuck 7 and a driving unit for the chuck fixed on the third sliding trolley. When the sliding platform rotates, the supporting and movable arm 21 rotates up and down. The driving unit for the chuck includes a driving motor 221 and a gear transmission mechanism 222, and the first sliding trolley 15 is driven by an oil cylinder 151 for driving the first sliding trolley along a longitudinal axis of the sliding platform 5, the second sliding trolley 20 are each driven by an oil cylinder, and the third sliding trolley 9 is driven by an oil cylinder 91 for driving the third sliding trolley.

The working process of the combined tire-disassembling device and the large horizontal tire changer is as follows. First, according to the diameter size of the tire, the platform oil cylinders rotate the sliding platform to adjust an angle between the supporting and movable arm of the chuck assembly and a horizontal plane; and the large tire with a diameter of about 2500 mm is able to be disassembled and assembled when the angle is the maximum. Then, the oil cylinder for driving the second shaft starts to drive the disassembling and assembling hook to retract axially away from the pressing wheel. The pressing wheel retracts in place. The tire is pressed by the pressing wheel while the tire is rotated to loosen the tire from the rim. Thereafter, the oil cylinder for driving the second shaft is actuated to drive the second shaft to extend toward the pressing wheel, so as to approach the joint between the tire and the rim and insert a bent part at the front end of the disassembling and assembling hook into one third of the width of the rim. The bent part at the front end of the disassembling and assembling hook is only in contact with the edge of the tire, and the tire is rotated to disassemble one side of the tire from the rim. Thereafter, the disassembling and assembling hook is retracted, and the other side of the tire is disassembled from the rim by using the pressing wheel after the tire disassembling mechanism 1 is moved to the other side of the tire, thus completing the tire disassembly.

The foregoing description is merely a further embodiment of the present disclosure, and the scope of protection of the present disclosure is not limited thereto. Any equivalent replacement or change made by those skilled in the art according to the technical solutions and the concepts of the present disclosure within the scope disclosed by the present disclosure all falls in the scope of the protection of the present disclosure.

What is claimed is:

1. A horizontal tire changer, comprising a base platform, a sliding platform provided at one end of the base platform, a chuck assembly and a tire disassembling mechanism which are movable along the sliding platform, a hydraulic driving device and an operating console, wherein the tire disassembling mechanism is a combined tire-disassembling device, the combined tire-disassembling device comprises a combined frame, a first shaft with a pressing wheel at a first end of the first shaft, and a second shaft with a disassembling and assembling hook at a first end of the second shaft, wherein the combined frame is provided on the first shaft, a shaft hole matched with the second shaft is provided in the combined frame, and the second shaft is mounted in the shaft hole; and the combined tire-disassembling device further comprising an oil cylinder for driving the second shaft, one end of the oil cylinder for driving the second shaft is connected with a second end of the second shaft, and another one end of the shaft oil cylinder for driving the second shaft is connected with the combined frame;

wherein the horizontal tire changer comprises platform oil cylinders, each of the platform oil cylinders is provided between a bottom of a corresponding one of both ends of the sliding platform and the base platform; the sliding platform is rotatably connected to the base platform through a connecting piece above the platform oil cylinders, and the sliding platform is configured to be rotated by the platform oil cylinders when the platform oil cylinders are actuated.

2. A horizontal tire changer according to claim 1, wherein the combined tire-disassembling device further comprises an oil cylinder fixing lug provided at the second end of the second shaft, and the second end of the second shaft is connected with the oil cylinder for driving the second shaft through the oil cylinder fixing lug.

3. A horizontal tire changer according to claim 2, wherein the combined tire-disassembling device further comprises a wheel-carrier seat with a hollow part in a middle thereof, a mounting seat and a wheel-carrier shaft which are provided at a second end of the first shaft, wherein the mounting seat is embedded in the hollow part of the wheel-carrier seat, and the wheel-carrier shaft extends through a front part of the wheel-carrier seat and the mounting seat, and is fixed with a tail part of the wheel-carrier seat.

4. A horizontal tire changer according to claim 3, wherein the combined tire-disassembling device further comprises a first sliding trolley which is fixed with the wheel-carrier seat, the first sliding trolley is driven by an oil cylinder for driving the first sliding trolley along a longitudinal axis of the sliding platform.

5. A horizontal tire changer according to claim 1, wherein a cross section of the first shaft is square.

6. A horizontal tire changer according to claim 1, wherein cross sections of both the second shaft and the shaft hole of the combined frame which is matched with the second shaft are hexagonal.

7. The horizontal tire changer according to claim 1, wherein the chuck assembly comprises a second sliding trolley matched with the sliding platform, a supporting and movable arm of which one end is vertically and fixedly connected with the second sliding trolley, a third sliding trolley provided at a front end of the supporting and movable arm, and a chuck and a driving unit for the chuck that are fixed on the third sliding trolley.

8. The horizontal tire changer according to claim 7, wherein the driving unit for the chuck includes a driving motor and a gear transmission mechanism, and the third sliding trolley is driven by an oil cylinder for driving the third sliding trolley.

\* \* \* \* \*